(12) United States Patent
Reinert et al.

(10) Patent No.: US 10,809,740 B2
(45) Date of Patent: Oct. 20, 2020

(54) METHOD FOR IDENTIFYING AT LEAST ONE SECTION OF A BOUNDARY EDGE OF AN AREA TO BE TREATED, METHOD FOR OPERATING AN AUTONOMOUS MOBILE GREEN AREA MAINTENANCE ROBOT, IDENTIFYING SYSTEM AND GREEN AREA MAINTENANCE SYSTEM

(71) Applicant: Andreas Stihl AG & Co. KG, Waiblingen (DE)

(72) Inventors: Michael Reinert, Rudersberg (DE); Andreas Strohmaier, Weissach (DE); Samuel Zoettl, Birgitz (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 84 days.

(21) Appl. No.: 16/003,644

(22) Filed: Jun. 8, 2018

(65) Prior Publication Data

US 2018/0356832 A1  Dec. 13, 2018

(30) Foreign Application Priority Data

Jun. 9, 2017  (EP) ..................................... 17175376

(51) Int. Cl.
*G06K 9/00* (2006.01)
*G05D 1/02* (2020.01)
*A01D 34/00* (2006.01)
*G06T 7/73* (2017.01)
*G06T 7/13* (2017.01)
*G05D 1/00* (2006.01)
*H04N 5/232* (2006.01)

(52) U.S. Cl.
CPC ......... *G05D 1/0253* (2013.01); *A01D 34/008* (2013.01); *G05D 1/0088* (2013.01);
(Continued)

(58) Field of Classification Search
CPC .. G05D 1/0253; G05D 1/0251; G05D 1/0088; G06T 7/13; G06T 7/73;
(Continued)

(56) References Cited

U.S. PATENT DOCUMENTS 7,636,126 B2 * 12/2009 Mallinson ................ H04N 5/04
   348/512
7,756,618 B2 *  7/2010 Mizusawa .......... B62D 15/0295
   382/104
(Continued)

FOREIGN PATENT DOCUMENTS

DE 10 2013 102 941 A1  9/2014
DE 10 2013 212 605 A1  12/2014
(Continued)

*Primary Examiner* — Amir Alavi
(74) *Attorney, Agent, or Firm* — Crowell & Moring LLP

(57) ABSTRACT

A method is provided for identifying at least one section of a boundary edge of an area to be treated and for operating an autonomous mobile green area maintenance robot on the area to be treated. The method includes recording live images using a camera, superimposing target symbols on the recorded live images, aiming with the target symbol and guiding the target symbol by orienting the camera, marking in respective images a boundary edge image point using the target symbol, and obtaining a sequence of position coordinates of a boundary edge based on the boundary edge image points.

5 Claims, 2 Drawing Sheets

(52) U.S. Cl.
CPC ......... *G05D 1/0219* (2013.01); *G05D 1/0221*
(2013.01); *G05D 1/0246* (2013.01); ***G05D
1/0251* (2013.01); *G06T 7/13* (2017.01); *G06T
7/73*** (2017.01); *G05D 2201/0201* (2013.01);
*G05D 2201/0208* (2013.01); *G06T 2207/10016*
(2013.01); *G06T 2207/30204* (2013.01); *H04N
5/23293* (2013.01)

(58) Field of Classification Search
CPC . G06T 2207/10016; G06T 2207/30204; G06T
17/00; G06T 19/20; H04N 5/23293;
G05B 19/4061; G06F 17/50; A01D
34/008
See application file for complete search history.

(56) References Cited

U.S. PATENT DOCUMENTS

| | | | | |
|---|---|---|---|---|
| 8,243,182 B2* | 8/2012 | Petrescu | ............ | H04N 5/23219 348/239 |
| 8,384,770 B2* | 2/2013 | Konno | ................. | H04N 13/239 348/51 |
| 8,456,534 B2* | 6/2013 | Henty | ................... | G06F 3/0304 345/157 |
| 8,639,039 B2* | 1/2014 | Kuraki | ................. | G06T 7/0002 382/103 |
| 9,684,435 B2* | 6/2017 | Carr | ..................... | G06F 3/04842 |
| 9,791,848 B2* | 10/2017 | Tanaka | .................... | G06T 19/20 |
| 2013/0282224 A1 | 10/2013 | Yazaki et al. | | |
| 2016/0316155 A1* | 10/2016 | Richards | ............... | H04N 5/3572 |
| 2018/0035606 A1* | 2/2018 | Burdoucci | ........... | A01D 34/008 |
| 2018/0356832 A1* | 12/2018 | Reinert | ............... | A01D 34/008 |

FOREIGN PATENT DOCUMENTS

| | | |
|---|---|---|
| DE | 10 2015 100 419 A1 | 7/2016 |
| EP | 2 684 438 A1 | 1/2014 |
| EP | 2 330 471 B1 | 10/2015 |
| JP | 2013-20543 A | 1/2013 |
| WO | WO 2017/092904 A1 | 6/2017 |

\* cited by examiner

METHOD FOR IDENTIFYING AT LEAST ONE SECTION OF A BOUNDARY EDGE OF AN AREA TO BE TREATED, METHOD FOR OPERATING AN AUTONOMOUS MOBILE GREEN AREA MAINTENANCE ROBOT, IDENTIFYING SYSTEM AND GREEN AREA MAINTENANCE SYSTEM

CROSS REFERENCE TO RELATED APPLICATION

This application claims priority under 35 U.S.C. § 119 from European Patent Application No. 17 175 376.7, filed Jun. 9, 2018, the entire disclosure of which is herein expressly incorporated by reference.

BACKGROUND AND SUMMARY OF THE INVENTION

The invention relates to a method for identifying at least one section of a boundary edge of an area to be treated, to a method for operating an autonomous mobile green area maintenance robot on the area to be treated, to an identifying system and to a green area maintenance system with such an identifying system and an autonomous mobile green area maintenance robot.

A method for identifying at least one section of a boundary edge of an area to be treated, a method for operating an autonomous mobile green area maintenance robot on an area to be treated that has a boundary edge, an identifying system and a green area maintenance system with such an identifying system and an autonomous mobile green area maintenance robot are known.

The invention addresses the problem of providing a method for identifying at least one section of a boundary edge of an area to be treated that is user-friendly. The invention also addresses the problem of providing a method for operating an autonomous mobile green area maintenance robot on an area to be treated that has a boundary edge, providing an identifying system and providing a green area maintenance system.

The invention solves this problem by providing methods and systems in accordance with claimed embodiments of the invention. Advantageous developments and/or refinements of the invention are described and claimed herein.

The method according to the invention for identifying at least one section of a boundary edge of an area to be treated, in particular by an autonomous mobile green area maintenance robot, comprises the steps of: a) recording, in particular automatically recording, live images by means of a camera; b) superimposing, in particular automatically superimposing, the recorded live images with a target symbol and displaying, in particular automatically displaying, the live images superimposed with the target symbol; c) aiming at the section with the target symbol and guiding the target symbol along the section by orienting the camera, in particular by a user; d) recording, in particular automatically recording, a sequence of images of the section by means of the camera during the guiding procedure; e) marking, in particular automatically marking, in a respective image of the recorded sequence of images, an image point referenced with the target symbol as a boundary edge image point; f) obtaining and/or determining, in particular automatically obtaining, a sequence of position coordinates of the section of the boundary edge on the basis of the boundary edge image points.

The method makes it possible to identify the sequence of position coordinates of the section of the boundary edge of the area in a user-friendly way. The sequence of the method can be relatively easy to understand, take relatively little time on the part of the user and require scarcely any or no physical work by the user.

The area may be for example an outdoor area, in particular unsealed ground, or a green area, such as a grassed area with lawns. The boundary edge may be defined or demarcated by a fence, a wall, a path, a terrace, a hedge, a bed, a pond, a transition between terrains, a marking and/or in some other way.

The camera may advantageously be a digital camera.

Steps a) and b) may be referred to as live view mode and/or live preview mode. In this case, the live images may be superimposed with the target symbol and displayed in real time. In other words: steps a) and b) may be performed at the same time, advantageously repeated several times. The target symbol may be referred to as crosshairs.

Steps a) and b) make it possible to aim at the section with the target symbol and guide the target symbol along the section by orienting the camera as in step c). Steps a) and b) may advantageously be performed at the same time as step c), in particular be repeated several times during step c). Steps a), b) and the aiming of step c) may be referred to as searching.

At least some images of the sequence of images recorded in step d) may themselves serve as live images of step a). Alternatively, the images recorded in step d) may be different from the live images.

The marking of step e) may take place in the respective image itself and/or as meta information, which is appended to the image. In particular, a central image point or a central pixel in the live images may be superimposed with the target symbol and/or correspondingly marked in the recorded sequence of images. Step e) may be performed at the same time as step d) and/or at a time after it.

Step e) makes it possible to provide a sequence of boundary edge image points, and consequently makes step f) possible. Step f) may be performed at the same time as step e) and/or at a time after it. The obtained sequence of position coordinates may advantageously be stored.

The position coordinates may be relative coordinates in a local coordinate system and/or absolute coordinates in a global coordinate system, such as the geographical coordinate system of planet Earth. In particular, relative coordinates may be transformed into global coordinates. A position of the camera during the recording of the sequence of images may be advantageously identified by means of at least one position determining device. The position may be appended as meta information to at least some of the images, in particular all the images, of the recorded sequence of images and be included in step f). In addition or alternatively, the orienting of the camera may be sensed during the guiding procedure of the target symbol along the section, in particular by means of at least one acceleration sensor, at least one rate-of-rotation sensor and/or at least one position determining device. The orientation may be appended as meta information to at least some of the images, in particular all the images, of the recorded sequence of images and be included in step f).

In a development of the invention, step d) comprises recording the sequence of images of the section from different positions and/or from different perspectives and/or from different standpoints. In addition or alternatively, step d) comprises recording the sequence of images of the section including depth information. Various positions can be reached by translational movement of the camera. The translational movement of the camera may be sensed, in particular by means of at least one acceleration sensor, at least one rate-of-rotation sensor and/or at least one position determining device. The translational movement may be appended as meta information to at least some of the images, in particular all the images, of the recorded sequence of images and be included in step f). In addition or alternatively, various positions can be reached by a further camera; in particular, a stereo camera may comprise the camera and the further camera. Which image has been recorded by which camera may be appended as meta information to at least some of the images, in particular all the images, of the recorded sequence of images and be included in step f). The camera may be a TOF camera in order to achieve depth information. TOF cameras are 3D camera systems that can measure distances by the time of flight method. The depth information may be included in step f).

In a development of the invention, in step f) the sequence of position coordinates of the section of the boundary edge is obtained on the basis of the boundary edge image points by means of photogrammetry. Photogrammetry may be understood as meaning a group of measuring methods and methods of evaluation by remote sensing, in order to determine and/or reconstruct from images of an object its spatial position or three-dimensional form. Advantageously by means of bundle adjustment, structure from motion and/or visual simultaneous localization and mapping. To put it another way: a map of the section of the boundary edge of the area, in particular a three-dimensional map, can be created from the recorded sequence of images. On the basis of the boundary edge image points, the sequence of position coordinates of the section of the boundary edge in the map can be identified. If a map is already available, the sequence of position coordinates of the section of the boundary edge can be identified in it, on the basis of the boundary edge image points.

In a development of the invention, the method comprises the steps of: g) recording live images of the section; h) superimposing the recorded live images with a boundary edge line on the basis of the obtained sequence of position coordinates of the section of the boundary edge and displaying the live images superimposed with the boundary edge line. Steps g) and h) make augmented reality possible for the user. Augmented reality may be understood as meaning the visual representation of information, in particular supplementing images with additional information and/or virtual objects by means of superimposing and/or overlaying. This makes it possible for the user to carry out a visual inspection and/or a check of the obtained sequence of position coordinates of the section of the boundary edge in an easy way. Like steps a) and b), steps g) and h) may be referred to as live view mode; in particular, steps g) and h) may be performed at the same time. Steps g) and h) may be performed after steps a), b), c), d), e) and f). In addition or alternatively, step g) may be performed at the same time as step a), in particular may correspond to step a). Correspondingly, step h) may be performed at the same time as step b). The boundary edge line may also be referred to as virtual spray.

In a development of the invention, the method comprises the steps of: i) outputting the obtained sequence of position coordinates of the section of the boundary edge; j) enabling the obtained sequence of position coordinates for processing. Step i) may advantageously be based on steps g) and h); in particular, the obtained sequence of position coordinates of the section of the boundary edge may be displayed in augmented reality mode. Processing may comprise editing, altering, displacing and/or smoothing. The processed sequence of position coordinates may advantageously be stored.

The invention also relates to a method for operating an autonomous mobile green area maintenance robot on the area to be treated that has the boundary edge. The method according to the invention comprises the previously described method for identifying at least one section of the boundary edge. The method also comprises the step of: controlling, in particular automatically controlling, a movement of the autonomous mobile green area maintenance robot on the area to be treated as a function of the obtained sequence of position coordinates at least of the section of the boundary edge such that the green area maintenance robot remains on the area to be treated, in particular within the boundary edge.

This makes it possible for the area that is to be treated to be autonomously maintained by means of the autonomous mobile green area maintenance robot. Autonomous maintenance may mean that the green area maintenance robot can move and/or act on the area to be treated in a self-reliant, self-acting, self-determined or self-controlled manner and/or independently of the user and/or can select at least one parameter, such as in particular a route parameter and/or a turning point. Autonomous maintenance may additionally or alternatively mean that the green area maintenance robot can automatically begin working and/or end working. During autonomous maintenance, the green area maintenance robot need not be controlled by the user, in particular remotely controlled. In other words, not during autonomous maintenance, the green area maintenance robot can in particular work without human control and/or guidance. The autonomous mobile green area maintenance robot may be referred to as a service robot. The green area maintenance robot may advantageously include a maintenance tool for maintaining the area to be treated.

In a development of the invention, the autonomous mobile green area maintenance robot includes a robot camera, in particular an orientable robot camera. The method comprises the step of: recording, in particular automatically recording, robot images of at least a portion of the area to be treated, in particular at least the section of the boundary edge, by means of the robot camera. The method comprises: controlling, in particular automatically controlling, the movement of the autonomous mobile green area maintenance robot on the area to be treated as a function of the recorded robot images.

The invention also relates to an identifying system, in particular for performing the previously described method. The identifying system according to the invention comprises an orientable camera, a computing unit and a display screen. The orientable camera is configured to record live images and the sequence of images of at least the section of the boundary edge of the area to be treated during an orientation procedure of the camera. The computing unit is configured to superimpose the recorded live images with the target symbol, to mark, in a respective image of the recorded sequence of images, the image point referenced with the target symbol as a boundary edge image point, and to obtain and/or determine the sequence of position coordinates of the section of the boundary edge on the basis of the boundary edge image points. The display screen is configured to display the live images superimposed with the target symbol.

The identifying system makes it possible to identify the sequence of position coordinates of the section of the boundary edge of the area in a user-friendly way.

The camera may advantageously be a digital camera. The display screen may be referred to as an electronic viewfinder. The display screen may in particular be configured as a touchscreen for outputting the obtained sequence of position coordinates of the section of the boundary edge and for processing. The computing unit may advantageously be additionally configured as a memory unit for storing at least the sequence of position coordinates of the section of the boundary edge. In particular, the identifying system may comprise at least one acceleration sensor, at least one rate-of-rotation sensor and/or at least one position determining device for sensing a position, an orientation and/or a translational movement of the camera. The computing unit may be configured to cooperate with the acceleration sensor, the rate-of-rotation sensor and/or the position determining device, if provided.

In a development of the invention, the identifying system comprises a mobile and/or portable identifying device. The mobile identifying device comprises the orientable camera and the display screen. The mobile identifying device may advantageously comprise the computing unit. The mobile identifying device may in particular be a smart phone and/or a tablet.

In a development, the identifying system comprises a further orientable camera. In addition or alternatively, the orientable camera comprises a TOF camera. The identifying system may in particular include a stereo camera, which may comprise the camera and the further camera.

The invention also relates to a green area maintenance system, in particular for performing the previously described method. The green area maintenance system according to the invention comprises the previously described identifying system, an autonomous mobile green area maintenance robot and a control unit. The control unit is configured to control the movement of the autonomous mobile green area maintenance robot on the area to be treated as a function of the obtained sequence of position coordinates at least of the section of the boundary edge such that the green area maintenance robot remains on the area to be treated, in particular within the boundary edge.

This makes it possible for the area that is to be treated to be autonomously maintained by means of the autonomous mobile green area maintenance robot.

The control unit may be configured to cooperate with the identifying system. The green area maintenance robot may in particular comprise the control unit. The green area maintenance robot may advantageously include a maintenance tool for maintaining the area to be treated.

In a development of the invention, the autonomous mobile green area maintenance robot includes a robot camera, in particular an orientable robot camera. The robot camera is configured to record robot images of at least a portion of the area to be treated. The control unit is configured to control the movement of the autonomous mobile green area maintenance robot on the area to be treated as a function of the recorded robot images.

In a development of the invention, the identifying system includes an identification transmission unit. The control unit includes a control transmission unit. The identification transmission unit and the control transmission unit are configured to cooperate with each other and to transmit in a wireless and/or cableless manner the obtained sequence of position coordinates at least of the section of the boundary edge. This makes user-friendly transmission possible.

In a development of the invention, the autonomous mobile green area maintenance robot is configured as a lawn mower robot including a lawn mower tool. The green area maintenance robot may in particular be configured as a mulching mower robot. The lawn mower tool may advantageously comprise at least one mowing line, at least one plastic cutter, at least one metal cutter and/or a metal cutting blade with at least one cutting edge and/or with at least one cutting tooth. This may allow cutting of grass, herbaceous plants, woody undergrowth or smaller trees/shrubs by means of the lawn mower tool. The lawn mower tool may advantageously be configured as a rotating lawn mower tool and for cutting the material to be cut by what is referred to as the free cutting method without a counter blade, in particular for producing a cutting operation by the centrifugal force of the lawn mower tool.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
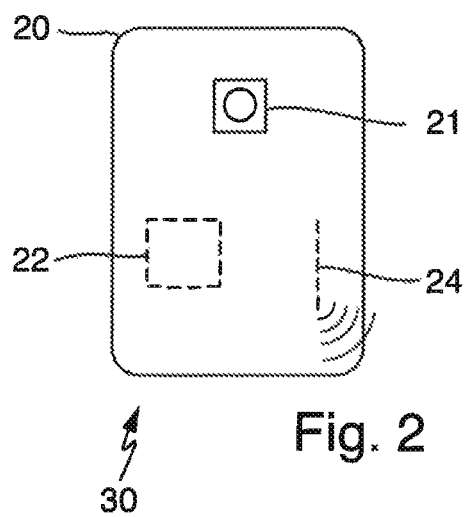
FIG. 2 shows a rear view of an identifying system according to an embodiment of the invention.
Figure 3:
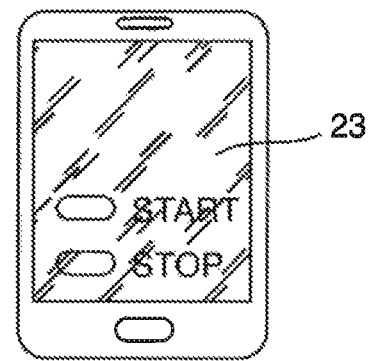
FIG. 3 shows a front view of the identifying system of FIG. 2.
Figure 5:
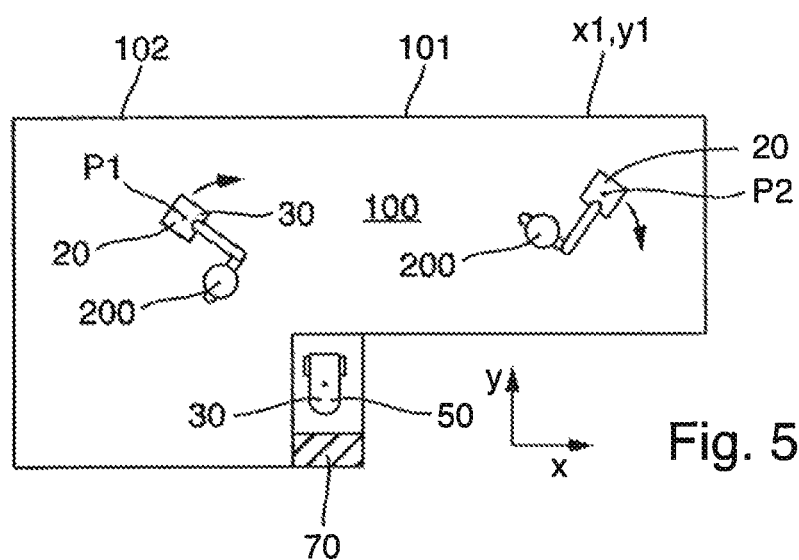
FIG. 5 shows a plan view of an area that is to be identified by means of the method of FIG. 1 and the identifying system of FIGS. 2 and 3 and is to be treated by means of the green area maintenance robot of FIG. 4.
Figure 6:
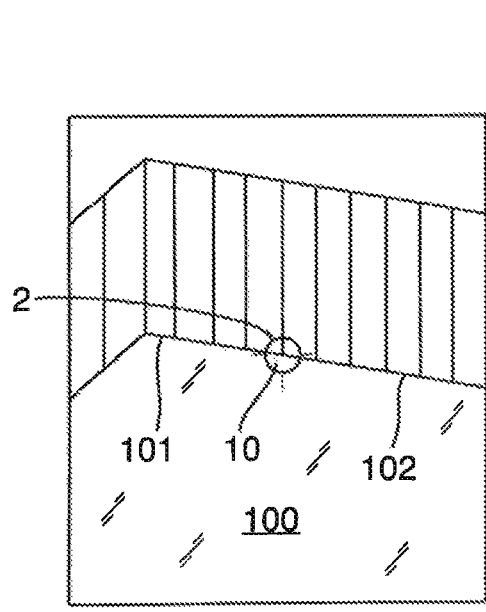
FIG. 6 shows a live image superimposed with a target symbol of a section of a boundary edge of the area of FIG. 5.
Figure 7:
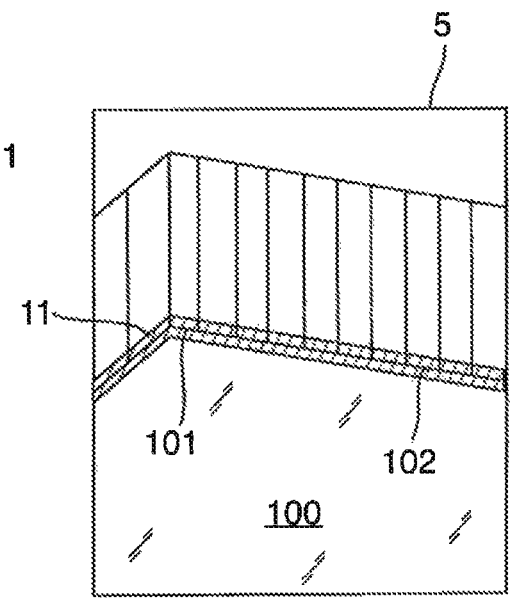
FIG. 7 shows a live image superimposed with a boundary edge line of the section corresponding to FIG. 6.

FIGS. 2 and 3 show an identifying system 20. The identifying system 20 includes an orientable camera 21, a computing unit 22 and a display screen 23. The orientable camera 21 is configured to record live images 1, 5, as can be seen in FIGS. 6 and 7, and a sequence of images 1 of at least one section 102 of a boundary edge 101 of an area 100 to be treated, as can be seen in FIG. 5, during an orientation procedure of the camera 21. The computing unit 22 is configured to superimpose the recorded live images 1 with a target symbol 10, to mark, in a respective image 1 of the recorded sequence of images, an image point 2 referenced with the target symbol 10 as a boundary edge image point, and to obtain a sequence of position coordinates x1, y1 of at least the section 102 of the boundary edge 101 on the basis of the boundary edge image points. The display screen 23 is configured to display the live images 1 superimposed with the target symbol 10, as can be seen in FIG. 6. In the exemplary embodiment shown, the boundary edge 101 in the form of a fence bounds or defines the area 100 to be treated in the form of a grassed area with lawns.

Consequently, the identifying system 20 makes it possible to identify the sequence of position coordinates x1, y1 at least of the section 102 of the boundary edge 101 of the area 100 to be treated in a user-friendly way.

In detail, the camera 21 is a digital camera, in particular a TOF camera. The computing unit 22 is additionally configured as a memory unit for storing at least the sequence of position coordinates x1, y1 of the boundary edge 101. The display screen 23 is configured as a touchscreen, in particular for outputting the obtained sequence of position coordinates x1, y1 and for processing them.

The identifying system 20 is a mobile identifying device in the form of a smart phone. The mobile identifying device comprises the orientable camera 21 and the display screen 23 and also in addition the computing unit 22.

Furthermore, the identifying system 20 includes an identification transmission unit 24. In the exemplary embodiment shown, the mobile identifying device comprises the identification transmission unit 24.

Figure 1:
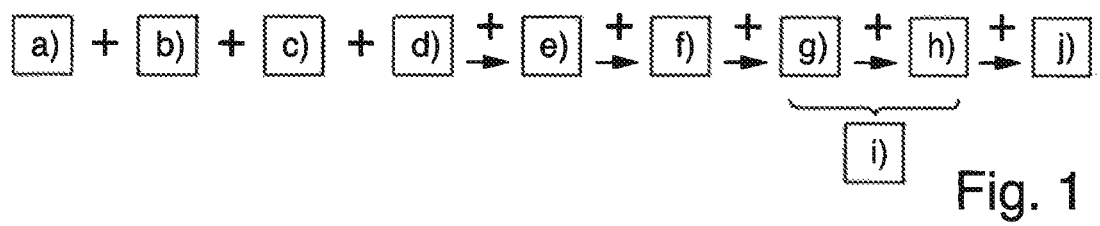
FIG. 1 shows a flow diagram of a method according to an embodiment of the invention.

FIG. 1 shows a method according to the invention for identifying at least the section 102 of the boundary edge 101 of the area 100 to be treated, in particular by means of the previously described identifying system 20. In a step a), live images 1 are recorded by use of the camera 21. In a step b), the recorded live images 1 are superimposed with a target symbol 10 in the form of crosshairs in real time, and the live images 1 superimposed with the target symbol 10 are displayed in real time, as can be seen in FIG. 6. Steps a) and b) may be referred to as live view mode. In a step c), the section 102 with the target symbol 10 is aimed at and the target symbol 10 is guided along the section 102 by orienting the camera 21, in particular by the user 200, as indicated in FIG. 5 by arrows. In a step d), the sequence of images 1 of the section 102 is recorded by way of the camera 21 during the guiding procedure. In the exemplary embodiment shown, an image 1 recorded in step d) serves as the live image of step a). In a step e), in a respective image of the recorded sequence of images 1, an image point 2 referenced with the target symbol 10 is marked as a boundary edge image point, as can be seen in FIG. 6. In the exemplary embodiment shown, a central image point 2 in the live image 1 is superimposed with the target symbol 10 and correspondingly, in the recorded sequence of images 1, the central image point is marked as the boundary edge image point. In a step f), the sequence of position coordinates x1, y1 at least of the section 102 of the boundary edge 101 is obtained on the basis of the boundary edge image points. In the exemplary embodiment shown, the obtained sequence of position coordinates x1, y1 is subsequently stored. The position coordinates x1, y1 are relative coordinates in a local coordinate system of the area 100, as indicated in FIG. 5 by the coordinate axes.

Consequently, the method correspondingly makes it possible to identify the sequence of position coordinates x1, y1 at least of the section 102 of the boundary edge 101 of the area 100 to be treated in a user-friendly way.

In detail, step d) comprises recording the sequence of images 1 of the boundary edge 101 from various positions P1, P2, as can be seen in FIG. 5. In the exemplary embodiment shown, the various positions P1, P2 are reached by translational movement of the camera 21; in particular, the user 200 walks around the grassed area 100. In addition, step d) comprises recording the sequence of images 1 of the boundary edge 101 including depth information, in particular by means of the TOF camera 21. In alternative exemplary embodiments, it may be sufficient that step d) may only comprise recording the sequence of images of the boundary edge from various positions or only comprise recording the sequence of images of the boundary edge including depth information. In further alternative exemplary embodiments, various positions may be reached by a further camera; in particular, the identifying system may include a stereo camera, which may comprise the camera and the further camera.

In step f), the sequence of position coordinates x1, y1 of the boundary edge 101 is obtained on the basis of the boundary edge image points by means of photogrammetry. To put it another way: a three-dimensional map of the boundary edge 101 of the area 100 is created from the recorded sequence of images 1. On the basis of the boundary edge image points, the sequence of position coordinates x1, y1 of the boundary edge 101 in the map is obtained. In order that the map can comprise not only the boundary edge 101, but also an interior of the area 100, additional recordings of the interior of the area 100 are possible. In order to be able to distinguish the recordings of the boundary edge 101 from recordings of the interior of the area 100, the recordings of the boundary edge 101 may be started by means of a start button on the touchscreen 23 at the beginning of the guiding procedure of step c) and ended by means of a stop button on the touchscreen 23 after the completion of the guiding procedure, as can be seen in FIG. 3.

Furthermore, the method comprises steps g) and h). In step g), further live images 5 of the boundary edge 101 are recorded by means of the camera 21. In step h), the recorded live images 5 are superimposed with a boundary edge line 11 on the basis of the obtained sequence of position coordinates x1, y1 of the boundary edge 101 by means of the computing unit 22 in real time and the live images 5 superimposed with the boundary edge line 11 are displayed by means of the display screen 23 in real time, as indicated in FIG. 7 by the hatching. Steps g) and h) make augmented reality possible for the user 200. This makes it possible for the user 200 to carry out a visual inspection of the obtained sequence of position coordinates x1, y1 of the boundary edge 101 in an easy way. In the exemplary embodiment shown, steps g) and h) are performed at a time after steps a), b), c), d), e) and f). In other words: the visual inspection takes place at a time after the completion of the obtainment of the sequence of position coordinates x1, y1 of the boundary edge 101. In alternative exemplary embodiments, step g) may be performed at the same time as step a). Correspondingly, step h) may be performed at the same time as step b). To put it another way: while the identification of the boundary edge 101 has not yet been fully completed, position coordinates x1, y1 already identified may be indicated by means of the boundary edge line 11. In this case, with the guiding of the target symbol 10 indicated in FIG. 5 from left to right, the boundary edge line 11 would be indicated in the image of FIG. 6 from the left edge of the image along the boundary edge 101 to the target symbol 10.

Moreover, the method comprises steps i) and j). In step i), the obtained sequence of position coordinates x1, y1 of the boundary edge 101 is output, in particular in the augmented reality mode of steps g) and h). In step j), the obtained sequence of position coordinates x1, y1 is enabled for processing, in particular by means of the touchscreen 23. The processed sequence of position coordinates x1, y1 can advantageously be subsequently stored.

Figure 4:
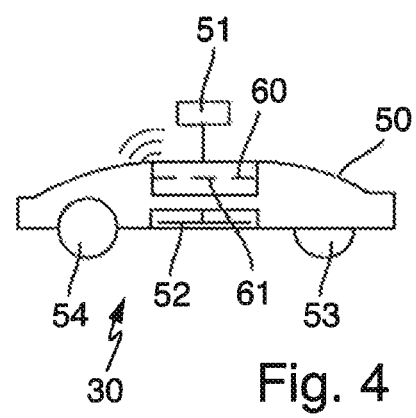
FIG. 4 shows a schematic view of an autonomous mobile green area maintenance robot of a green area maintenance system according to an embodiment of the invention.

The identifying system 20 is part of a green area maintenance system 30 according to an embodiment of the invention. Apart from the identifying system 20, the green area maintenance system 30 includes an autonomous mobile green area maintenance robot 50 and a control unit 60, as shown in FIG. 4. The control unit 60 is configured to control a movement of the green area maintenance robot 50 on the area 100 to be treated as a function of the obtained sequence of position coordinates x1, y1 of the boundary edge 101 such that the green area maintenance robot 50 remains on the area 100, in particular within the boundary edge 101. In the exemplary embodiment shown, the green area maintenance robot 50 comprises the control unit 60. The control unit 60 is configured to cooperate with the identifying system 20.

Consequently, the green area maintenance system 30 makes it possible for the area 100 to be autonomously maintained by means of the autonomous mobile green area maintenance robot 50.

Correspondingly, a method according to an embodiment of the invention for operating the autonomous mobile green area maintenance robot 50 on the area 100 to be treated that has the boundary edge 101 comprises the previously described method for identifying the boundary edge 101. Furthermore, the method comprises the step of: controlling the movement of the green area maintenance robot 50 on the area 100 as a function of the obtained sequence of position coordinates x1, y1 of the boundary edge 101 such that the green area maintenance robot 50 remains on the area 100, in particular within the boundary edge 101.

Consequently, the method makes it possible for the area 100 that is to be treated to be autonomously maintained by means of the autonomous mobile green area maintenance robot 50.

In detail, the autonomous mobile green area maintenance robot 50 includes an orientable robot camera 51. The robot camera 51 is configured to record robot images of at least a portion of the area 100 to be treated, in particular at least the section 102 of the boundary edge 101. The control unit 60 is configured to control the movement of the green area maintenance robot 50 on the area 100 as a function of the recorded robot images.

Correspondingly, the method comprises the step of: recording robot images of at least the portion of the area 100 to be treated by means of the robot camera 51. The method comprises controlling the movement of the autonomous mobile green area maintenance robot 50 on the area 100 as a function of the recorded robot images.

In detail, the control unit 60 includes a control transmission unit 61. The identification transmission unit 24 of the identifying system 20 and the control transmission unit 61 are configured to cooperate with each other and to transmit in a wireless manner the obtained sequence of position coordinates x1, y1 of the boundary edge 101, in particular from the mobile identifying device to the autonomous mobile green area maintenance robot.

The autonomous mobile green area maintenance robot 50 is configured as a lawn mower robot including a lawn mower tool 52, in particular as a mulching mower robot. In the exemplary embodiment shown, the lawn mower tool 52 comprises a metal cutting blade with cutting teeth. The lawn mower tool 52 is configured as a rotating lawn mower tool and for cutting the area 100 to be treated by the free cutting method, in particular for producing a cutting operation by centrifugal force of the lawn mower tool 52.

The autonomous mobile green area maintenance robot 50 also has front running wheels 53, which are pivotable, and rear running wheels 54, which are driven separately from one another. Consequently, the green area maintenance robot 50 can automatically move and steer itself on the area 100 to be treated. Furthermore, the green area maintenance robot 50 has an electric motor (not shown) for driving the lawn mower tool 52. In alternative exemplary embodiments, the green area maintenance robot 50 may include an internal combustion engine, in particular a petrol engine, for driving the lawn mower tool 52. What is more, the green area maintenance robot 50 includes a rechargeable battery (not shown) for supplying driving power to the rear running wheels 54 and the electric motor for driving the lawn mower tool 52. In alternative exemplary embodiments, the green area maintenance robot may include a fuel cell or some other kind of driving power source for supplying driving power.

Furthermore, the green area maintenance system 30 includes a base station 70 for the autonomous mobile green area maintenance robot 50, which here is arranged at the boundary edge 101 of the area 100, as can be seen at the bottom of FIG. 5. In the exemplary embodiment shown, the base station 70 is configured as a charging station for recharging, in particular for automatically recharging, the rechargeable battery of the green area maintenance robot 50.

As the exemplary embodiments shown and explained above make clear, the invention provides an advantageous method for identifying at least one section of a boundary edge of an area to be treated that is user-friendly, and also a method for operating an autonomous mobile green area maintenance robot on the area to be treated, an identifying system and a green area maintenance system with the identifying system and the autonomous mobile green area maintenance robot.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for identifying at least one section of a boundary edge of an area to be treated, the method comprising the steps of:
    a) recording live images using a camera,
    b) superimposing the recorded live images with a target symbol and displaying the live images with the superimposed target symbol,
    c) aiming at the section with the target symbol and guiding the target symbol along the section by orienting the camera,
    d) recording a sequence of images of the section using the camera during the guiding procedure,
    e) marking, in a respective image of the recorded sequence of images, an image point referenced with the target symbol as a boundary edge image point, and
    f) obtaining a sequence of position coordinates of the section of the boundary edge based on the boundary edge image points.

2. The method according to claim 1, wherein step d) comprises:
    recording the sequence of images of the section from different positions, and/or
    recording the sequence of images of the section including depth information.

3. The method according to claim 1,
    wherein in step f) the sequence of position coordinates of the section of the boundary edge is obtained based on the boundary edge image points using photogrammetry.

4. A method for identifying at least one section of a boundary edge of an area to be treated, the method comprising the steps of:
    a) recording live images using a camera,
    b) superimposing the recorded live images with a target symbol and displaying the live images with the superimposed target symbol, c) aiming at the section with the target symbol and guiding the target symbol along the section by orienting the camera,
d) recording a sequence of images of the section using the camera during the guiding procedure,
e) marking, in a respective image of the recorded sequence of images, an image point referenced with the target symbol as a boundary edge image point,
f) obtaining a sequence of position coordinates of the section of the boundary edge based on the boundary edge image points,
g) recording live images of the section, and
h) superimposing the recorded live images with a boundary edge line based on the obtained sequence of position coordinates of the section of the boundary edge and displaying the live images with the superimposed boundary edge line.

5. The method according to claim 4, further comprising the steps of:
i) outputting the obtained sequence of position coordinates of the section of the boundary edge, and
j) enabling the obtained sequence of position coordinates for processing.

\* \* \* \* \*